2,804,945

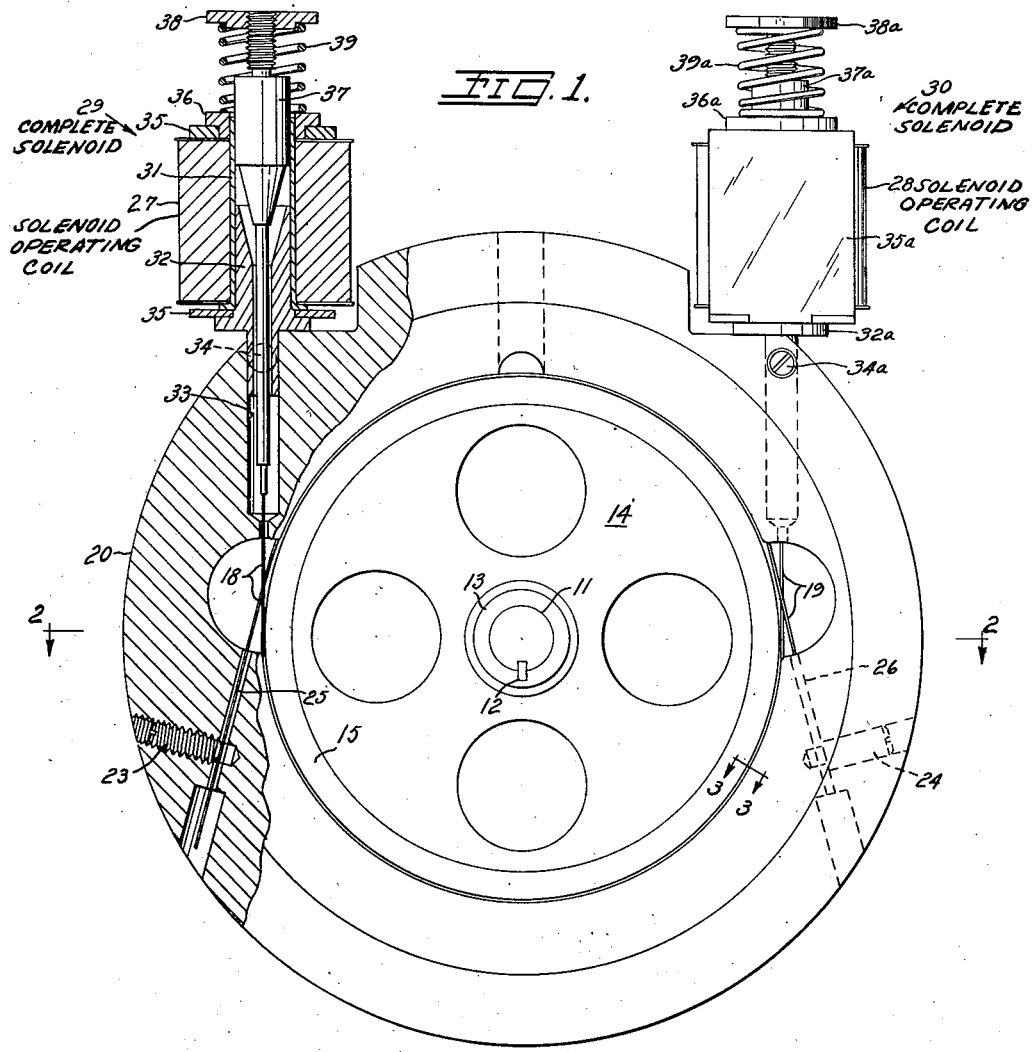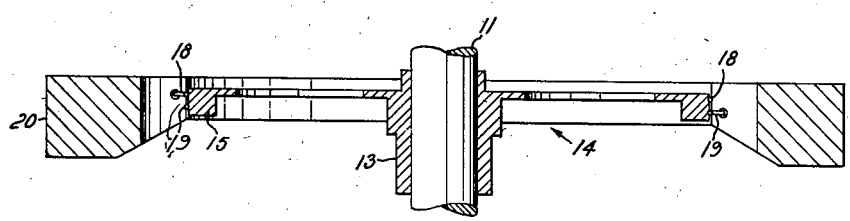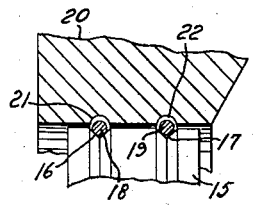

PRECISION BRAKE

Irwin B. Thierman, Portland, Oreg., assignor to Iron Fireman Manufacturing Company, Portland, Oreg.

Application September 23, 1954, Serial No. 457,990

4 Claims. (Cl. 188—77)

This invention relates generally to mechanical brakes of the flexible band and drum type and more particularly to such brakes especially adapted for use in precision instruments.

It has been found in the gyroscope art that if it is desired to cage such a device as a gyro-vertical, or to orient the device with its platform, a desirable way to accomplish the result simply and quickly and without requiring large outside forces is to immobilize the gyroscope about one of its axes of freedom other than the spin axis and simultaneously to apply an erecting torque about the other of its axes of freedom other than the spin axis. When erected about the other axis the gyroscope is immobilized about this other axis, released for movement about the one axis and erecting torque is applied to the gyroscope about the one axis.

In caging or erecting a gyro-vertical in this way it is usually desired to accomplish the result in the shortest possible time and with the least possible shock to the mechanism. Random precessional torques are to be avoided and to avoid them it is desirable that the immobilizing means should apply no torque to the gyroscope about the axis about which the gyro-vertical is being immobilized lest a precessional erecting torque in the wrong direction about the other axis be set up.

It is well known that in setting up a band brake a torque is applied to the brake drum in the direction of pull to tighten the brake band. Since for lightness of weight and simplicity of mechanism the use of band brakes for the suggested purpose is indicated it has been discovered that if two opposed band brakes are used simultaneously their opposed tightening torques will cancel out.

It is therefor a primary object of this invention to provide a precision brake of the band type having two similar but opposed band elements provided with identical operating parts adapted to be simultaneously operated.

For the intended purpose it is necessary that the brakes be of minimum size and occupy a minimum amount of space and yet be positive in operation. It is also required that when released the brake will have no possible drag or partial action.

It is therefor a second object to provide such a brake having a brake drum of large braking surface diameter and braking surface area with a minimum of weight.

And it is a third object to provide such a brake in which the brake bands are positively located throughout their lengths in either their braking or released positions.

How these and other objects are attained is explained in the following description referring to the attached drawing in which Figure 1 is an elevation in partial section of one form of the brake of this invention viewed longitudinally of the shaft to which the brake drum is applied.

Figure 2 is section along the line 2—2 of Figure 1.

Figure 3 is a fragmentary enlargement taken along the line 3—3 of Figure 1.

Like reference numerals refer to like parts in the several figures of the drawing.

Referring now to the drawings one of the gimbal axles 11 of a gyro-vertical is shown as having secured against rotation thereon by key 12 the hub 13 of a brake drum 14 having a rim 15 into the outer cylindrical surface of which are formed annular grooves 16, 17, in which spring wire brake bands 18 and 19 seat to frictionally engage drum 14 when the brake is applied.

Fixed to the platform, not shown, of the gyroscope, not shown, is brake housing 20 radially spaced from drum 14, as shown. Sunk into the inner cylindrical surface of housing 20 in the planes of drum grooves 18, 19, respectively, are housing grooves 21, 22 (see Figure 3) determining the positions of rest of brake bands 18 and 19 when the brake is not applied. The fixed ends of band wires 18, 19 are secured respectively by screws 23, 24 in holes 25, 26 formed in housing 20.

Insulated operating coils 27, 28 of electric solenoids 29, 30, respectively are typically shown for solenoid 29 to be pressed onto flanged cylindrical brass core 31 carried on electrical steel stop 32 secured by screw 34 in hole 33 formed in housing 20. Electrical steel solenoid frame 35 surrounds coil 27. The upper side of frame 35 is formed with a circular hole to receive electrical steel housing 36 having a central hole formed therethrough to receive core 31. The lower side of frame 35 is formed with a circular hole to receive stop 32. The similar parts where indicated for solenoid 30 are marked with similar reference numerals having the suffix a.

The movable end of wire brake band 18 is silver soldered into an axial hole (not shown) into the reduced diameter lower end of solenoid armature 37 guided in core 31. The upper end of armature 37 is reduced in diameter and threaded to receive brake tension adjusting nut 38 between which and bushing 36 brake tension spring 39 is strained.

As seen in Figure 1 both brake bands 18 and 19 are normally positioned in their brake applied positions of contact with brake drum 14 and tensioned in position by springs 39, 39–a, respectively.

When electrical energy is simultaneously applied from a source, not shown, to the terminals, not shown, of coils 27, 28, armatures 37, 37–a, are drawn downwardly in cores 31 and 31–a, not shown, thus placing bands 18, 19 in axially applied compressive strain, crowding bands 18, 19, radially outward to seat firmly in grooves 21, 22, of housing 20 where they have no possible contact with or drag on drum 14.

When coils 27, 28 are simultaneously disconnected from the electrical source, not shown, springs 39, 39–a, act in unison to put bands 18, 19 in axial tensile strain causing them to move radially inwardly to seat firmly in grooves 16, 17 of drum 14 and grip drum 14 with sufficient frictional drag to halt any motion which shaft 11 may have with respect to housing 20 and hold the parts firmly in that relation.

It is apparent that if there is any torque applied to drum 14 by one of the bands during the braking instant it will be exactly opposed and cancelled out by a similar opposite torque applied by the other band.

It should also be noticed that except for the instant of operation the brake bands 18, 19 will at all times be firmly seated in either the drum grooves or the housing groove from which they cannot be displaced by vibration or other outside forces.

Having thus recited some of the objects of my invention, illustrated and described a preferred form in which my invention may be practiced and explained by its operation, it is apparent that there are many analogous forms in which the essentially novel and useful elements of my invention may be formed and combined and I desire to hold for myself these elements and combinations and their equivalents as fairly defined in the following claims, I claim 1. A brake band comprising a brake drum rotatable on an axis, said drum being formed with an outer cylindrical surface coaxial with said axis, a stationary brake housing formed with a cylindrical inner surface coaxial with said outer cylindrical surface, a brake band secured at one end to said housing and means secured to said housing adapted alternately to apply longitudinal tensile and compressive stresses to said band at its other end, said inner cylindrical surface being radially spaced from said outer cylindrical surface less than the radial thickness of said band, each of said surfaces having grooves sunk therein in the same plane normal to said axis, said grooves being wider than said band, the bottoms of said grooves being radially spaced one from the other a distance greater than the radial thickness of said band and the bottoms of said grooves being axially narrowed to center said band in one of said grooves when either compressive or tensile stress is applied longitudinally to said band by said means secured to said housing.

2. The brake of claim 1 in which said brake band over the length of its braking surface consists of a single strand of spring metal wire.

3. The brake of claim 1 in which each of said surfaces have an additional groove sunk therein in an additional plane normal to said axis, said additional grooves being formed similarly with said first mentioned grooves, in which said additional grooves are occupied by an additional brake band secured to said housing at one end, in which an additional means secured to said housing is adapted alternately to apply longitudinal tensile and compressive stresses to said additional band at its other end and in which said additional band from its end of attachment to said housing is wrapped on said drum in the opposite direction from which the first mentioned band is wrapped on said drum.

4. The brake of claim 3 in which said additional brake band over the length of its braking surface consists of a single strand of spring metal wire.

References Cited in the file of this patent

UNITED STATES PATENTS

| | | |
|---|---|---|
| 1,239,194 | Loomis | Sept. 4, 1917 |
| 1,622,785 | Hollingsworth | Mar. 29, 1927 |
| 2,637,415 | Winther | May 5, 1953 |

FOREIGN PATENTS

| | | |
|---|---|---|
| 498,588 | Great Britain | Jan. 10, 1939 |